(No Model.)
J. E. PORTER.
HAY ELEVATOR AND CARRIER.
No. 519,270. Patented May 1, 1894.
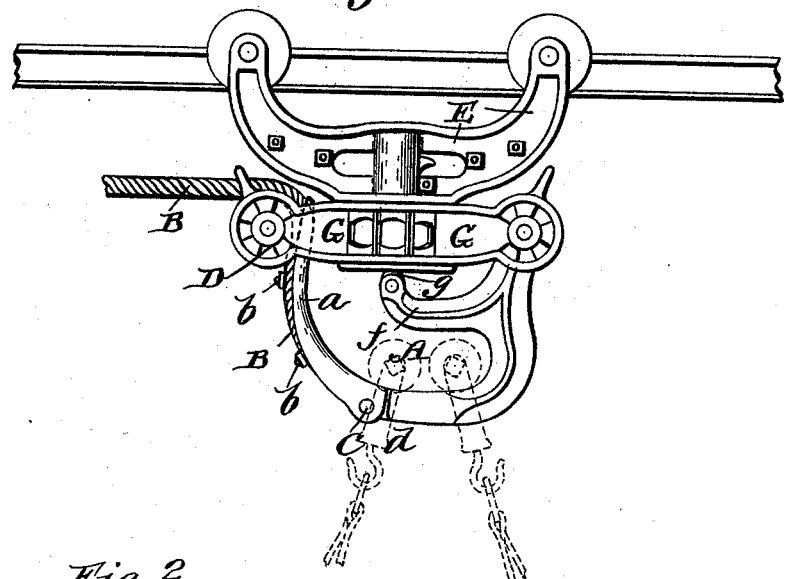
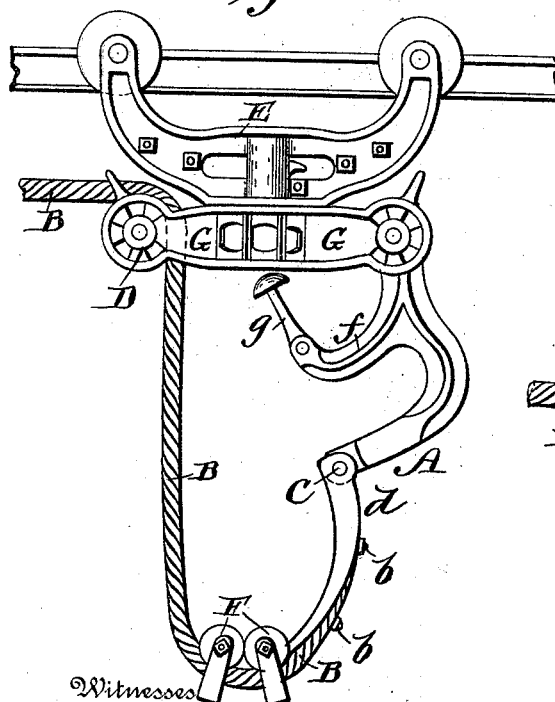
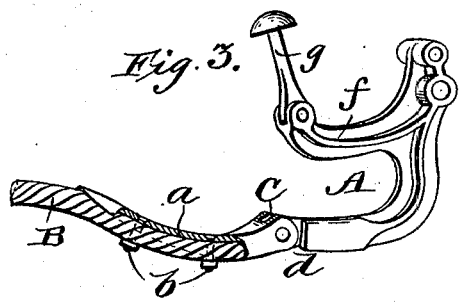
Witnesses
Severance
C. C. Hines
Inventor
Joseph E. Porter
by Mason, Fenwick & Lawrence
Attorneys

United States Patent Office.

JOSEPH E. PORTER, OF OTTAWA, ILLINOIS.

HAY ELEVATOR AND CARRIER.

SPECIFICATION forming part of Letters Patent No. 519,270, dated May 1, 1894.

Application filed May 25, 1893. Renewed March 20, 1894. Serial No. 504,463. (No model.)

*To all whom it may concern:*

Be it known that I, JOSEPH E. PORTER, a citizen of the United States, residing at Ottawa, in the county of La Salle and State of Illinois, have invented certain new and useful Improvements in Hay Elevators and Carriers; and I do hereby declare the following to be a full, clear, and exact description of the invention, such as will enable others skilled in the art to which it appertains to make and use the same.

My invention relates to an improvement in hay carriers and elevators, and has reference especially to the draft rope connecting arm shown in my application for a patent filed February 23, 1893, Serial No. 463,372, on which a patent was allowed April 15, 1893.

My present invention consists in providing a joint in the connecting arm between the portion which is hinged to the carriage and the portion which is attached to the draft rope, whereby the said connecting arm is permitted to pass up with the rope behind the guide pulley or sheave in said carrier and thus more perfectly affords a guard and a support for the trolley wheels to which the sling, fork or other hay lifting means are attached, as will be hereinafter described.

In the accompanying drawings, Figure 1 is a side elevation of a portion of a hay elevator track, carrier, elevating means, draft rope and my improved jointed connecting arm with locking device attached and trolley pulleys resting on same the parts being in an elevated and locked position. Fig. 2 is a similar view, the parts being in a lowered position and unlocked. Fig. 3 is a detail perspective view of the connecting arm, locking device and a portion of the draft rope on an enlarged scale, the parts being in the position shown in Fig. 2.

A in the drawings represents the draft rope connecting arm. This arm has a pivoting end $d$, a short branch $f$, carrying locking bolt $g$, and it is curved and hollowed along a great part of its length on its under side as indicated at $a$, and in its hollowed part the draft rope B is placed and fastened securely by spuds or bolts and nuts as indicated at $b$. Beyond the hollowed portion it is made solid, and instead of being made rigid as in my aforesaid application, it is constructed with a joint C in the manner shown in the drawings, or in any other practical manner. In all other respects the connecting arm A is constructed, connected to the wheeled carriage E, and operated the same as in my aforesaid application, and need not therefore be more particularly described here. The length of the portion of the arm to which the draft rope is fastened is sufficient to allow its outer end to extend up behind the draft pulley or sheave D of the carriage E, when the load of hay is elevated and the same locked up. By providing the connecting arm with a joint C, the trolleys F have a metallic bearing upon the arm up to the lower bar of the sheave-frame of the carriage, and said arm, beyond this point, extends up through the sheave frame G as illustrated in Fig. 1.

The within described improvement I have found to be quite important and useful in the manipulation of hay elevators and slings as it effectually controls the trolleys and prevents their binding and holds the trolley pulleys in position when loaded, and it enables them to move very smoothly on and off the continuous metallic bearing afforded by the connecting jointed arm.

What I claim as my invention is—

1. The draft rope-connecting device of a hay sling and carrier, having a branch arm for supporting a locking bolt, an end by which it is pivoted to the carriage, and a longer arm, jointed between the pivotal end and the end by which it is attached to the draft rope, substantially as and for the purpose described.

2. The combination of the wheeled carriage draft rope pulley frame, the draft rope, the double armed connecting device having a joint in its longest branch or arm, and the trolley pulleys provided with means for attachment to a fork or sling, substantially as and for the purpose described.

In testimony whereof I hereunto affix my signature in presence of two witnesses.

JOSEPH E. PORTER.

Witnesses:
J. O. HARRIS,
V. C. HARRIS.